(12) United States Patent
Chen

(10) Patent No.: US 8,279,594 B2
(45) Date of Patent: Oct. 2, 2012

(54) DATA TRANSMISSION BASE AND PORTABLE ELECTRONIC APPARATUS

(75) Inventor: Liang-Wei Chen, Hsinchu (TW)

(73) Assignee: Arcadyan Technology Corporation, Hsinshu (TW)

( * ) Notice: Subject to any disclaimer, the term of this patent is extended or adjusted under 35 U.S.C. 154(b) by 616 days.

(21) Appl. No.: 12/353,736

(22) Filed: Jan. 14, 2009

(65) Prior Publication Data
US 2010/0042768 A1 Feb. 18, 2010

(30) Foreign Application Priority Data
Aug. 15, 2008 (TW) ................ 97131112 A

(51) Int. Cl.
*H05K 5/00* (2006.01)
*H05K 7/00* (2006.01)
*H01R 13/66* (2006.01)
*H01R 13/62* (2006.01)

(52) U.S. Cl. ........... 361/679.4; 361/679.41; 361/679.43; 361/679.45; 361/679.55; 361/679.56; 361/679.57; 361/679.58; 439/151; 439/153; 439/154; 439/155; 439/328

(58) Field of Classification Search .. 361/679.4–679.45, 361/679.55–679.6
See application file for complete search history.

(56) References Cited

U.S. PATENT DOCUMENTS

| | | | |
|---|---|---|---|
| 6,873,356 B1 * | 3/2005 | Kanbe et al. | 348/207.1 |
| 2004/0125553 A1 * | 7/2004 | Castell et al. | 361/683 |
| 2006/0190664 A1 * | 8/2006 | Chen | 710/313 |
| 2007/0008688 A1 * | 1/2007 | Liang | 361/683 |
| 2008/0123283 A1 * | 5/2008 | Mellage et al. | 361/686 |

* cited by examiner

*Primary Examiner* — Jayprakash N Gandhi
*Assistant Examiner* — Jerry Wu
(74) *Attorney, Agent, or Firm* — Muncy, Geissler, Olds & Lowe, PLLC

(57) ABSTRACT

A data transmission base is used to transmit data for a data transmission device. The data transmission device has a data transmission body and a cover. The data transmission body has a first transmission interface. The data transmission base includes a transmission connection body and a cover connection body. The transmission connection body has a second transmission interface for connecting the first transmission interface. The cover connection body, which is connected to the transmission connection body, is used for connecting the cover.

12 Claims, 4 Drawing Sheets

DATA TRANSMISSION BASE AND PORTABLE ELECTRONIC APPARATUS

CROSS REFERENCE TO RELATED APPLICATIONS

This Non-provisional application claims priority under 35 U.S.C. §119(a) on Patent Application No(s). 097131112 filed in Taiwan, Republic of China on Aug. 15, 2008, the entire contents of which are hereby incorporated by reference.

BACKGROUND OF THE INVENTION

1. Field of Invention

The present invention relates to a transmission base and, more particularly, to a data transmission base and a portable electronic apparatus.

2. Related Art

Accompanying the progressive of technology, the portable electronic apparatus are becoming popular. These portable electronic apparatus, such as mobile data storage devices, recording pens, or antennas, all have a data transmission body for transmitting the data, and the data transmission body includes a transmission interface, such as a universal serial bus (USB) interface or a FireWire interface for transmitting or receiving the data.

In order to protect the transmission interface from being entered by an outside object or being damaged by external forces, the portable electronic apparatus usually includes a cover disposed on the transmission interface for protection.

However, when the users want to use the portable electronic apparatus and remove the cover, it is always a problem to find a place to put down the cover.

SUMMARY OF THE INVENTION

In view of the foregoing, the present invention is to provide a data transmission base and a portable electronic apparatus, on the top of which a cover can be placed by a user for easier use and hence increase the product competitiveness.

To achieve the above, the present invention discloses a data transmission base used to transmit data for a data transmission device. The data transmission device has a data transmission body and a cover. The data transmission body has a first transmission interface. The data transmission base includes a transmission connection body and a cover connection body. The transmission connection body has a second transmission interface for connecting the first transmission interface. The cover connection body, which is connected to the transmission connection body, is used for connecting the cover.

In addition, the present invention further discloses a portable electronic apparatus used to transmit data for a data transmission device. The data transmission device includes a data transmission body and a cover. The data transmission body has a first transmission interface. The portable electronic apparatus includes a housing, a transmission connection body, and a cover connection body. The transmission connection body is connected to the housing and has a second transmission interface for connecting the first transmission interface. The cover connection, which is connected to the transmission connection body or the housing, is used for connecting the cover.

As described above, each of the data transmission base and the portable electronic apparatus according to the present invention is configured with a cover connection body. The cover connection body can be connected to the cover of the data transmission device so that it would be easier for users to place the cover and hence increase the product efficiency and competitiveness.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
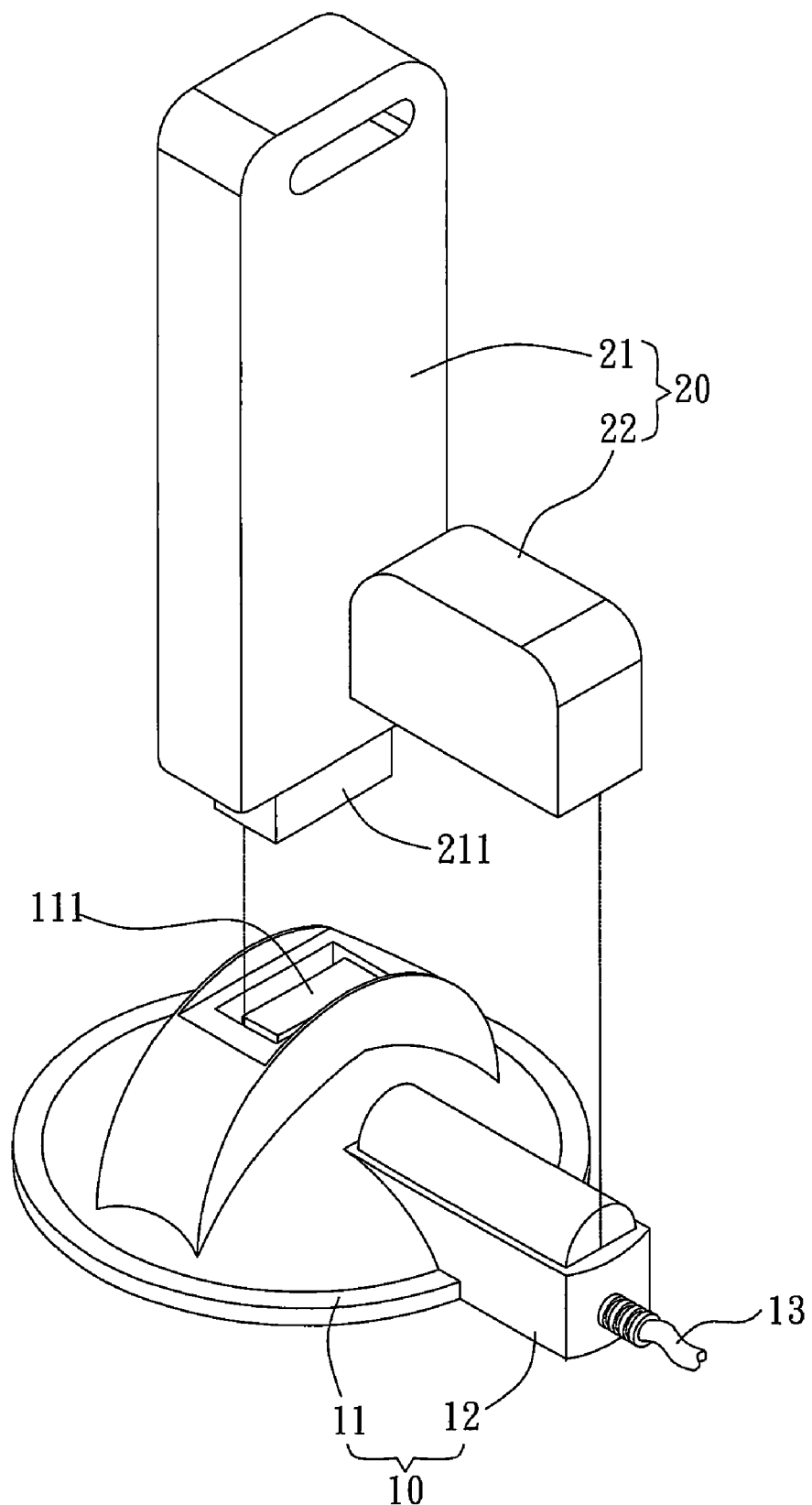
FIGS. 1A and 1B are schematic views illustrating a data transmission base connecting to a data transmission device according to a preferred embodiment of the present invention.
Figure 1B:
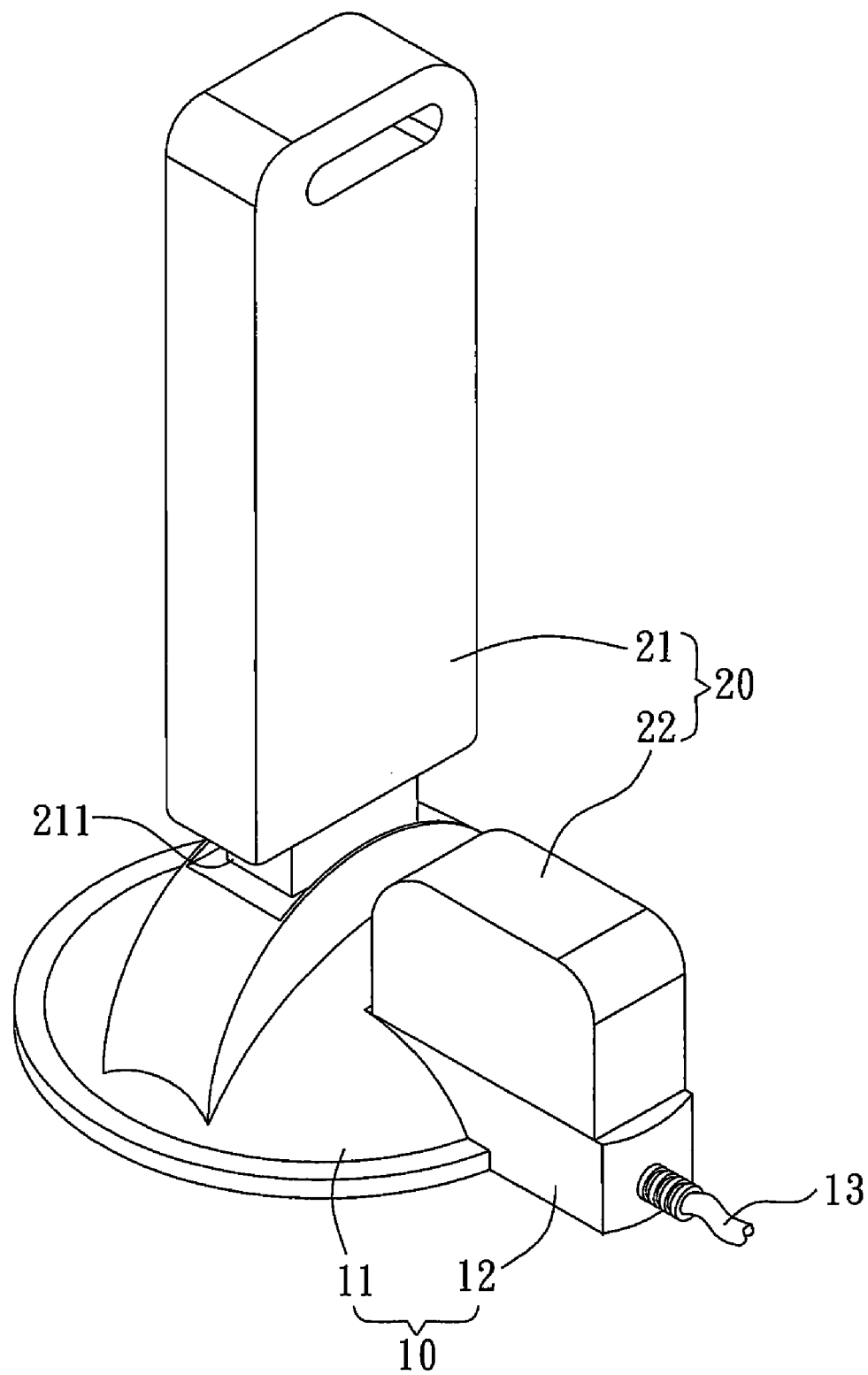

FIGS. 1A and 1B are schematics views illustrating a data transmission base 10 connecting to a data transmission device 20 according to a preferred embodiment of the present invention. FIG. 1A is a schematic view illustrating the data transmission base 10 before connecting to the data transmission device 20. FIG. 1B is a schematic view illustrating the data transmission base 10 after connecting to the data transmission device 20.

With reference to FIGS. 1A and 1B, the data transmission base 10 in the embodiment is used to transmit data for the data transmission device 20. The data transmission device 20 in the embodiment may be, for example but not limited to, a mobile data storage device, a recording device, or an antenna device. The data transmission device 20 includes a data transmission body 21, which includes a first transmission interface 211, and a cover 22. The data transmission body 21 may include the hardware and/or software for receiving, storing, or transmitting data. The hardware includes the memory, control chip, circuit board, or antenna, for example. The cover 22 may be combined with the data transmission body 21. For example, the cover 22 may cover the first transmission interface 211 to prevent the first transmission interface 211 from being entered by an outside object or being damaged by an external force. The first transmission interface 211 in the embodiment is, for example but not limited to, a universal serial bus (USB) interface, a FireWire interface (i.e. IEEE 1394 interface), a peripheral component interface-express (PCI-E) interface, or other data transmission interfaces.

The data transmission base 10 includes a transmission connection body 11 and a cover connection body 12. The shape of the transmission connection body 11 in the embodiment is not limited and can be designed by requirement. The transmission connection body 11 has a second transmission interface 111, which may be connected to the first transmission interface 211 to transmit the data for the data transmission body 21. The second transmission interface 111 and the first transmission interface 211 are the same kind of interface. The second transmission interface 111 may be, for example, a USB interface, a FireWire interface, a PCI-E interface, or other data transmission interfaces.

The cover connection body 12 may be connected to the transmission connection body 11 by gluing, cogging, or locking, or they can be integrally formed. In the embodiment, the cover connection body 12 and the transmission connection 11 are integrally formed. The cover connection body 12 may be connected to the cover 22 by covering, cogging, embedding, or locking. In the embodiment, the cover connection body 12 is connected to the cover by covering. Naturally, the cover connection body 12 may have a corresponding structure, for example, a protruding bulk, a clasp, or a trench, in accordance with the way of connection. The shape of cover connection body 12 in the embodiment is not limited and can be designed in accordance with the cover 22.

Furthermore, the data transmission base 10 further includes a transmission line 13 that is electrically connected to the second transmission interface 111. Thus, the data can be transmitted from the data transmission body 21 to an external electronic device through the second transmission interface 111. The transmission line 13 is connected to the transmission connection body 11 or the cover connection body 12 structurally. In the embodiment, the transmission line 13 is connected to the cover connection body 12 for example.

Figure 2:
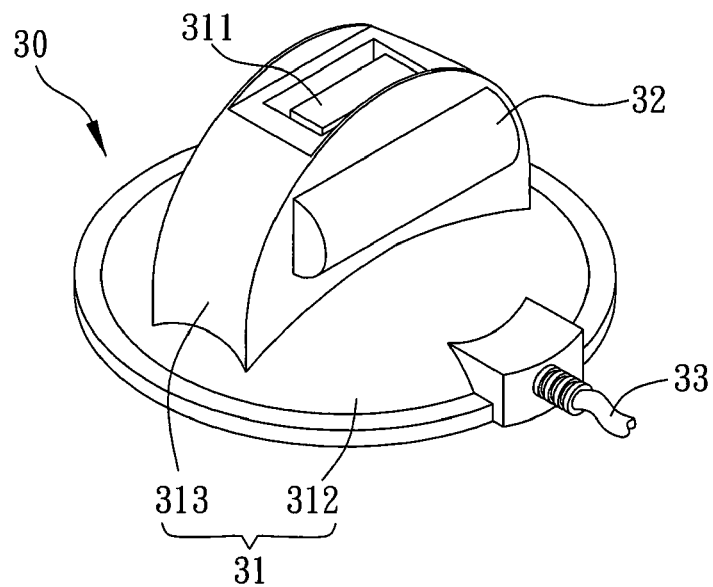
FIG. 2 is a schematic view of a data transmission base according to another preferred embodiment of the present invention.

FIG. 2 shows a data transmission base 30 of another preferred embodiment of the present invention. As shown in FIG. 2, the data transmission base 30 includes a transmission connection 31 and a cover transmission 32. The difference between the data transmission base 10 and the data transmission base 30 is that the transmission connection body 31 has a base 312 and a connecting part 313, which are connected with each other, and the second transmission interface 311 is accommodated in the connecting part 313. Besides, the cover connection body 32 may be connected to the base 312 or the connecting part 313. In the embodiment, the cover connection body 32 is connected to the connecting part 313 for example.

Figure 3:
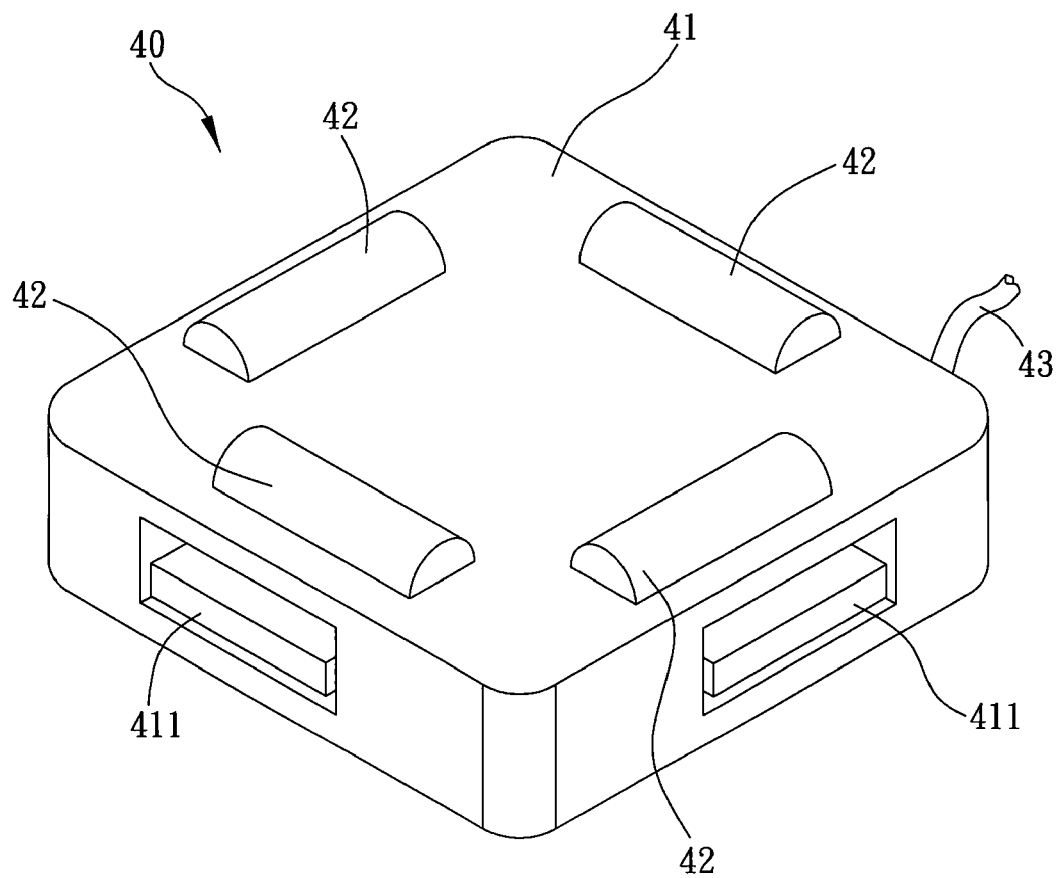
FIG. 3 is a schematic view of a data transmission base according to yet another preferred embodiment of the present invention.

FIG. 3 shows a data transmission base 40 of yet another preferred embodiment of the present invention. As shown in FIG. 3, the data transmission base 40 includes a transmission connection body 41 and at least one cover connection body 42. The difference between this embodiment and the above embodiment is that the transmission connection body 41 has a plurality of second transmission interfaces 411 and a plurality of cover connection bodies 42. In the embodiment, there are four second transmission interfaces 411 (located on the four sides of the transmission connection body 41) and four cover connection bodies 42. Thus, the data transmission base 40 may be connected to multiple data transmission devices and their covers to enhance the efficiency.

Figure 4:
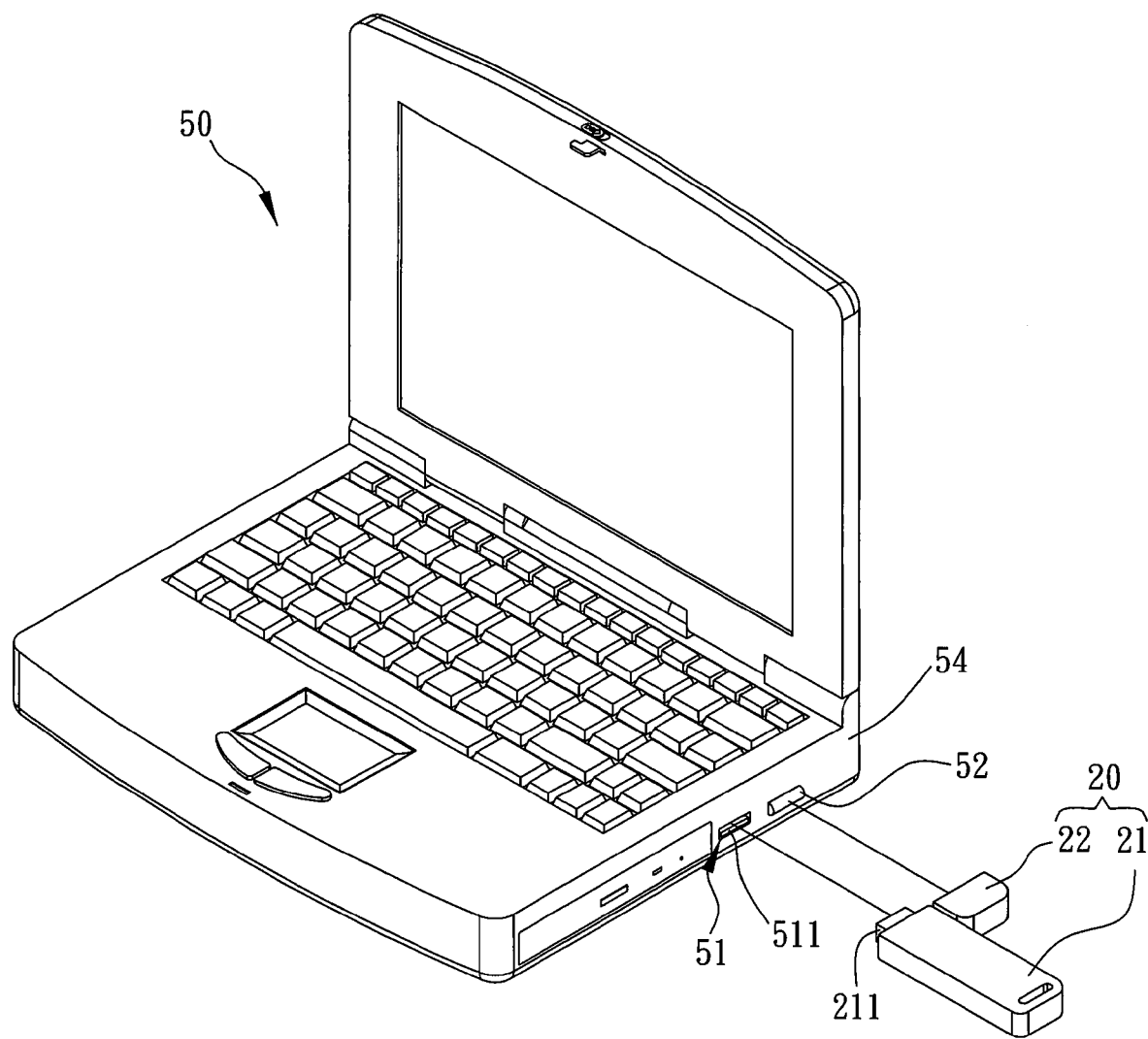
FIG. 4 is a schematic view of a portable electronic apparatus according to the preferred embodiment of the present invention.

FIG. 4 is a schematic view of a portable electronic apparatus 50 according to the preferred embodiment of the present invention. With reference to FIG. 4, the portable electronic apparatus in the embodiment is a laptop for example; it can be other electronic apparatus such as an ultra-mobile PC (UMPC), a PDA, or a mobile communication device as well. The portable electronic apparatus 50 is used to transmit the data for a data transmission device 20 that has a data transmission body 21 and a cover 22. The data transmission body 21 includes a first transmission interface 211. Since the data transmission device 20 has been described above, the detailed description thereof will be omitted.

The portable electronic apparatus 50 includes a housing 54, a transmission connection body 51, and a cover connection body 52. The housing 54 in the embodiment is the housing containing the host of the laptop for example. The transmission connection body 51 is connected to the housing 54 and has a second transmission interface 511 that may be connected to the first transmission interface 211 for transmitting the data between the data transmission body 21 and the portable electronic apparatus 50. The second transmission interface 511 and the first transmission interface 211 are the same kind of interface. The second transmission interface 511 may be a USB interface, a FireWire interface, a PCI-E interface, or other data transmission interfaces.

The cover connection body 52 may be connected to the housing 54 or the transmission connection body 51. In the embodiment, the cover connection body 52 is connected to the housing 54 for example. The cover connection body 52 is connected to the cover 22 by covering, cogging, embedding, or locking for example. In the embodiment, the cover connection body 52 is connected to the cover 22 by covering. The cover connection body 52 may also have a corresponding structure, for example, a protruding bulk, a clasp, or a trench, in accordance with the way of connection. The embodiment does not limit the shape of the cover connection body 52, which may be designed according to the cover 22. The cover connection body 52 may be disposed adjacent to the transmission connection body 51 so that it would be easier for the user to place the cover 22.

To sum up, the data transmission base and the portable electronic device of the present invention have a cover connection body that may be connected to the cover of the data transmission device. Thus, it would be easier for the user to place the cover hence increase the product efficiency and competitiveness.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A data transmission base used to transmit data for a data transmission device, the data transmission device having a data transmission body and an interface protecting cover, the data transmission body having a first transmission interface, an interface protecting cover covers the first transmission interface to prevent the first transmission interface from being entered by an outside object or being damaged by an external force, the data transmission base comprising:

a transmission connection body having a second transmission interface for connecting the first transmission interface; and a cover connection body connected to the transmission connection body, wherein the interface protecting cover is attached to the data transmission device to cover the first transmission interface when the data transmission device is separated from the transmission connection body, and the interface protecting cover is separated from the data transmission device and then an opening of the interface protecting cover is attached to a curved protrusion of the cover connection body for temporarily storage when the second transmission interface connects the first transmission interface.

2. The data transmission data according to claim 1, wherein the transmission connection body is connected to the cover connection body by gluing, cogging, or locking, or the transmission connection body and the cover connection body are integrally formed.

3. The data transmission base according to claim 1, wherein the second transmission interface is a universal serial bus (USB) interface or a FireWire interface.

4. The data transmission base according to claim 1, further comprising:
a transmission line electrically connected to the second transmission interface.

5. The data transmission base according to claim 1, wherein the transmission connection body comprises a base and a connecting part connecting to each other, and the second transmission interface is accommodated in the connecting part.

6. The data transmission base according to claim 5, wherein the cover connection body is connected to the base or the connecting part.

7. The data transmission base according to claim 1, wherein the data transmission device is a mobile data storage device, a recording device, or an antenna device.

8. A portable electronic apparatus used to transmit data for a data transmission device, the data transmission device having a data transmission body and an interface protecting cover, the data transmission body having a first transmission interface, the interface protecting cover covers the first transmission interface to prevent the first transmission interface from being entered by an outside object or being damaged by an external
force, the portable electronic apparatus comprising: a housing;
a transmission connection body connected to the housing and having a second transmission interface for connecting the first transmission interface; and
a cover connection body connected to the transmission connection body or the housing, wherein the interface protecting cover is attached to the data transmission device to cover the first transmission interface when the data transmission device is separated from the transmission connection body, and the interface protecting cover is separated from the data transmission device and then an opening of the interface protecting cover is attached to a curved protrusion of the cover connection body for temporarily storage when the second transmission interface connects the first transmission interface.

9. The portable electronic apparatus according to claim 8, wherein the cover connection body is disposed adjacent to the transmission connection body.

10. The portable electronic apparatus according to claim 8, wherein the second transmission interface is a universal serial bus (USB) interface or a FireWire interface.

11. The portable electronic apparatus according to claim 8, wherein the portable electronic apparatus is a laptop, an ultra-mobile PC, a PDA, or a mobile communication device.

12. The portable electronic apparatus according to claim 8, wherein the data transmission device is a mobile data storage device, a recording device, or an antenna device.

* * * * *